United States Patent [19]
Pfaff

[11] 3,903,343
[45] Sept. 2, 1975

[54] METHOD FOR REDUCING SINK MARKS IN MOLDED GLASS FIBER REINFORCED UNSATURATED POLYESTER COMPOSITIONS, AND MOLDED ARTICLES THEREBY PRODUCED

[75] Inventor: Frederick Pfaff, Cornwells Heights, Pa.

[73] Assignee: Rohm & Haas Company, Philadelphia, Pa.

[22] Filed: June 20, 1972

[21] Appl. No.: 264,672

[52] U.S. Cl. ............ 428/168; 156/209; 156/220; 264/122; 264/255; 428/218; 428/285; 428/409; 428/431
[51] Int. Cl.² .............. B32B 3/00; B29D 3/02
[58] Field of Search .......... 161/116, 123, 156, 162, 161/166, 168, DIG. 4, 93, 170, 145, 124, DIG. 3, 195, 231; 156/242, 245, 178, 179, 209, 219, 220; 264/255, 122, 112, 113

[56] References Cited
UNITED STATES PATENTS
| | | | |
|---|---|---|---|
| 2,765,247 | 10/1956 | Graham | 161/166 |
| 3,385,749 | 5/1968 | Hampshire | 161/164 |
| 3,449,482 | 6/1969 | Mitchell et al. | 264/122 |
| 3,507,730 | 4/1970 | Gambill et al. | 264/255 |
| 3,615,979 | 10/1971 | Davis, Sr. | 156/179 |
| 3,684,645 | 8/1972 | Templ et al. | 161/DIG. 4 |
| 3,730,808 | 5/1973 | Fekete et al. | 161/170 |

FOREIGN PATENTS OR APPLICATIONS
| | | | |
|---|---|---|---|
| 659,664 | 3/1963 | Canada | 161/162 |
| 968,773 | 9/1964 | United Kingdom | |
| 2,011,296 | 6/1969 | France | 161/166 |
| 1,180,572 | 2/1970 | United Kingdom | 161/156 |

*Primary Examiner*—George F. Lesmes
*Assistant Examiner*—Stanley S. Silverman
*Attorney, Agent, or Firm*—Michael B. Fein

[57] ABSTRACT

Sink marks over ribs and bosses in molded articles formed from sheet molding compounds are greatly reduced or eliminated by a process wherein sheet molding compounds having different glass fiber lengths are combined and molded so that short glass fiber lengths are provided on the rib side and long glass fiber lengths are provided on the appearance side. Novel molded articles are thereby produced.

6 Claims, 6 Drawing Figures

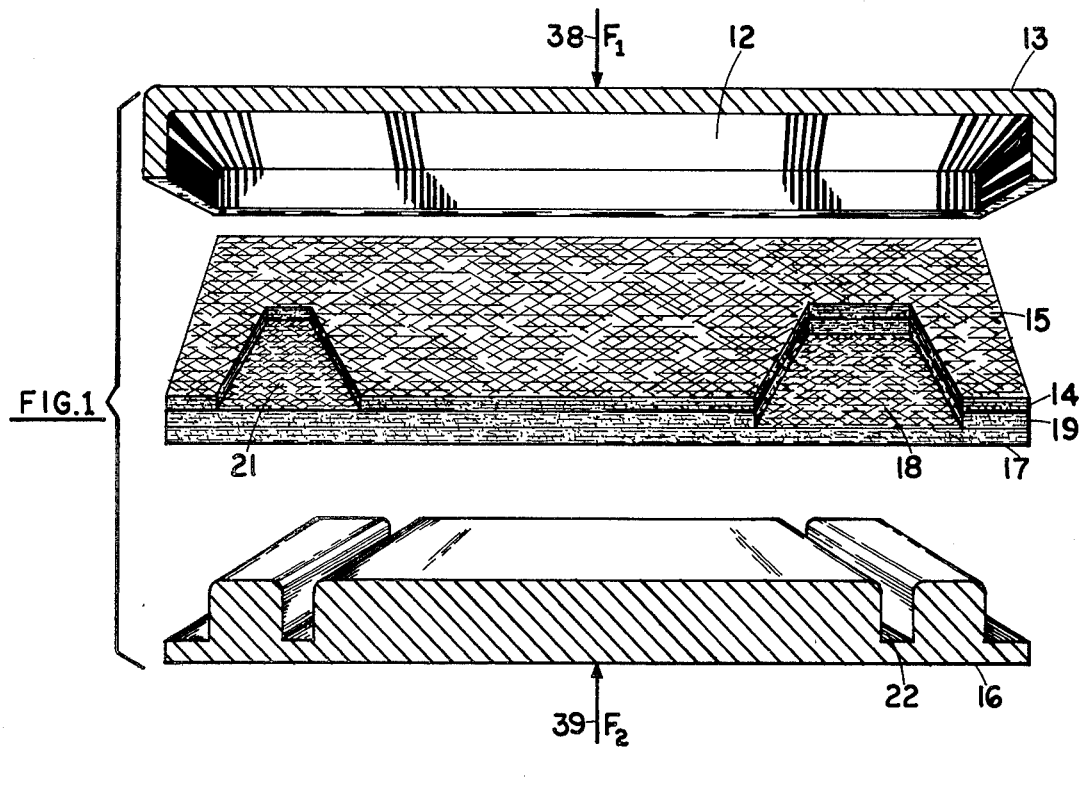
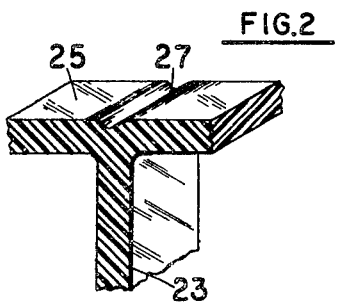 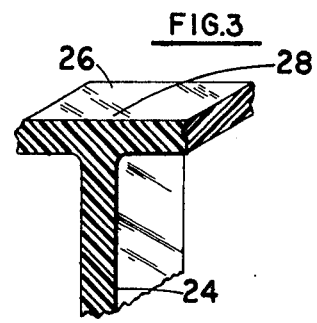
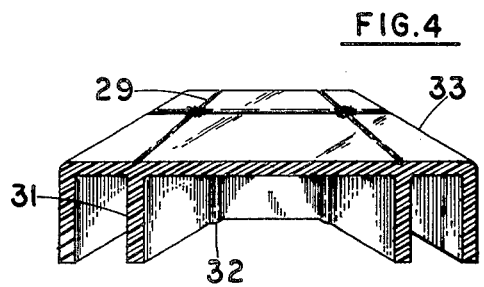 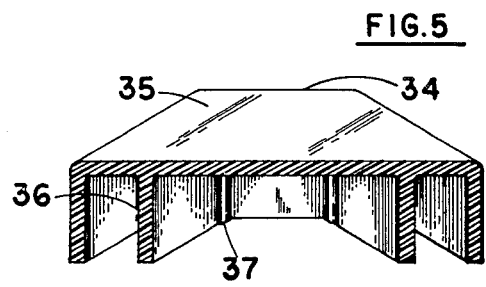

METHOD FOR REDUCING SINK MARKS IN MOLDED GLASS FIBER REINFORCED UNSATURATED POLYESTER COMPOSITIONS, AND MOLDED ARTICLES THEREBY PRODUCED

This invention relates to glass fiber reinforced molded articles having an appearance surface and an opposite convoluted surface, e.g., having ribs and bosses.

A recent development in the field of glass fiber reinforced polyesters has been the low shrink unsaturated polyester compositions which when molded are free of the roughness caused by prominence of glass fiber reinforcement upon polymerization shrinkage of the polyester on curing. Another development has been the system wherein sheet molding compounds (SMC) are employed. Sheet molding compounds are made by continuously spreading a layer of unsaturated polyester resin composition across a first continuously moving film while adding glass roving, typically chopped to 1 and 2 inch lengths, onto the resin layer. Glass usually makes up about 5 to 50% and more typically, 20 to 30% by weight of the product. Another layer of resin carried on a second continuous film is then introduced on top of the glass to complete the sandwich, which then passes through kneading rolls which assure complete wetting of the glass by the resin. The completed sheet molding compound (SMC) is then usually rolled up and stored while the thickening reaction takes place. When the correct viscosity is reached, the film is removed and from one to several plies of sheet molding compound of the appropriate size are introduced in a heated matched die mold and molded. An advantage to the SMC process is that relatively large and complicated pieces that vary greatly in thickness and that have molded-in ribs, inserts, bosses, or other convoluted shapes can be made. The flexibility in the use of SMCs comes from their excellent flow properties since SMC is designed to soften and flow during the molding to completely fill the mold, carrying the reinforcement with it and resulting in high strength molded articles. A problem which has been found with prior SMC systems and has inhibited the commercial growth of these systems has been the problem of sink marks in the appearance surfaces of the molded articles above the ribs, bosses and inserts which are molded on the opposite side. For example, an automobile hood molded from SMC with reinforcing ribs and bosses on the bottom has been found to exhibit undesirable surface imperfections, i.e., sink marks on the appearance surface above the ribs and bosses. Such sink marks are frequently visible even when the hood is painted.

It is, therefore, an object of this invention to provide glass fiber reinforced molded articles having an appearance surface and an opposite convulted surface having large variations in thickness wherein the appearance surface is substantially free of imperfections of the sink mark type.

It is a further object to provide articles molded from sheet molding compound having ribs and bosses on one side and a second relatively smooth and substantially free of surface imperfections of the sink mark type.

A further object is to provide a process for making glass fiber reinforced articles having reinforcing ribs and bosses on one side and a second side substantially free of sink marks.

These and other objects, as will become apparent from the following description, are achieved by this invention which comprises glass fiber reinforced molded articles having a first appearance surface substantially free of imperfections and a second surface opposite said first surface having a relatively convoluted shape wherein the glass fibers closest to the first surface are at least twice as long as the glass fibers closest to the second surface. These articles are prepared by a novel method wherein, in one embodiment, at least one ply of sheet molding compound having long glass fibers is introduced so as to be molded against the appearance surface-forming side of a mold and at least one ply of sheet molding compound having short glass fibers is introduced at the convoluted side of the mold. In another embodiment, a single ply having fibers adjacent one side and long fibers adjacent the opposite side is introduced in the mold so that the long fibers are molded against the appearance surface-forming side of the mold.

FIG. 1 is a cross-sectional view of three plies of sheet molding compound in position to be molded.

FIG. 2 is a cross-sectional perspective view of a section of a molded article of the prior art.

FIG. 3 is a cross-sectional perspective view of a section of a molded article of the invention.

FIG. 4 is a cross-sectional perspective view of a larger section of an article molded in accordance with prior art.

FIG. 5 is a cross-sectional perspective view of a molded article molded in accordance with the invention.

Figure 6:
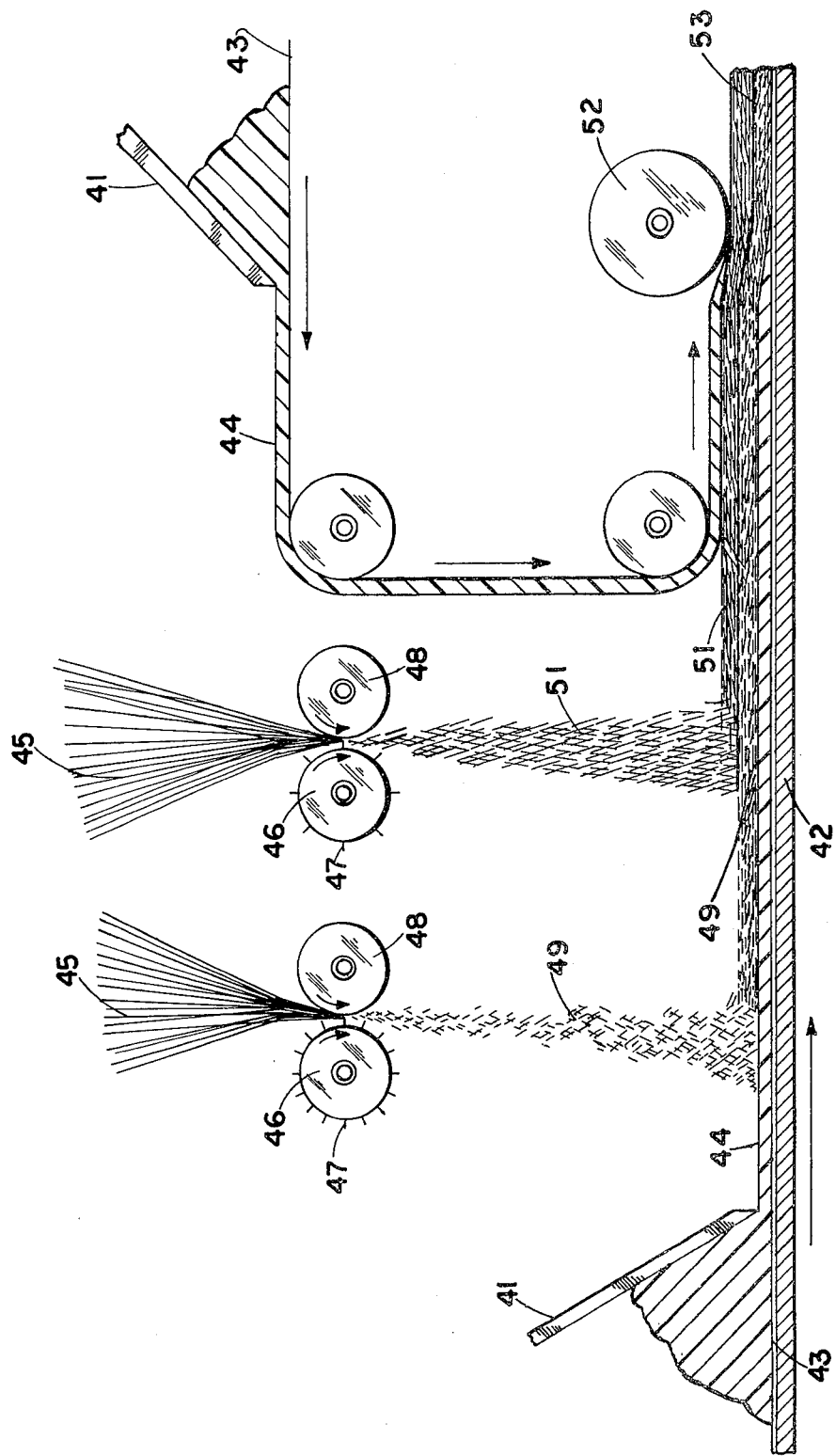
FIG. 6 is an elevational view partially in cross section of sheet molding composition being produced in accordance with the invention.

The compositions used for sheet molding compounds comprise any glass fiber reinforced low shrink unsaturated polyester system. Preferably, low shrink compositions such as are disclosed in U.S. patent application Ser. No. 770,085 are employed. The compositions contain chemical thickening agents which impart a thickening reaction between the time the SMC is prepared and the time it is molded. Suitable fillers, release agents and catalysts are disclosed in a paper entitled "Low Shrink Polyester Resins for Sheet Molding Compound" by Espenshade and Lowry, 26th Annual Technical Conference, Reinforced Plastics Composites Division, Society for Plastic Industry, February, 1971. Sheet molding compound is generaly prepared as described above. One suitable apparatus for preparing SMC is disclosed in U.S. Pat. No. 3,615,979. For preparation of single ply SMC of the second embodiment, i.e., containing both long and short fibers, one suitable apparatus is shown in FIG. 6.

Upon applying heat and pressure to the multiple plies of SMC, a molded article is obtained conforming to the shape of the mold. In prior art SMC systems, a problem was that in areas of the appearance surface of the article above rib and bosses, slight depressions, commonly called sink marks, occurred. While reductions in sink to as low as an average detph of 250–300 micro inches was obtainable with optimum low shrink formulations and molding conditions, even such small sink marks are visible through typical paint coatings. The present invention makes possible a reduction in depth of sink marks to a fraction of that previously achieved. In optimum embodiments, the sink marks are substantially eliminated by the invention.

In accordance with one embodiment of the invention, a ply of sheet molding compound having long glass fibers is introduced in a mold so as to become the appearance side of the molded article and one or more plies of sheet molding compound having short glass fibers is introduced on the opposite side of the mold, i.e., the side having the extreme variations in thickness such as ribs, bosses, inserts, threads, and the like. The length of the glass fibers can be controlled for example, by spacing of the cutter blades on the glass roving chopper of the apparatus used to prepare the SMC. Alternatively, glass fiber mats containing fibers of the deesired lengths may be used for reinforcement. The long glass fibers are from about 1 to 4 inches. Fibers longer than 4 inches can also be employed but they are not typical in the art. The short glass fibers are from about ⅛ to about 1 inch with the proviso that the ratio of the length of the long fibers to the length of the short fibers is at least 2:1. Typically the glass chopper apparatus does not cut each fiber to exactly the same length, so what is meant by the above-mentioned lengths is really an average length. Longer and shorter fibers can be mixed in a single ply to give an average "long" or average "short" fiber length, but in most cases such as a procedure has no advantages.

Depending upon the depth of the ribs and bosses it has been found that the weight ratio of short fibers to long fibers should be at least 1 and preferably greater than 1. The preferred weight ratio is from about 2 to 10.

The SMC suitable for use in the process and articles of this invention contains from about 5 to about 50% by weight of glass fibers and the remainder is a resinous mixture comprising low shrink unsaturated polyester resin, filler, free radical initiator or catalyst, chemical thickening agent and mold release agent. Suitable fillers include calcium carbonate, which is preferred, and are present in amounts from about 50 to about 300 parts by weight, based on 100 parts by weight of resin.

The sheet molding compound can be from about 0.02 to 0.5 or more inches thick when the multiple ply embodiment is employed, and about 0.2 to 1 or more inches thick when the single ply embodiment is employed.

More than two plies of SMC can be used, and, in fact, 3 to 10 or more plies are preferred, with from 3 to about 6 being typical. Preferably the multiple plies contain approximately equal weight percentages of glass.

One theory to explain the invention is that when sheet molding compounds of the prior art type are used to make articles having an appearance side and a rib and boss side in a mold under pressure, distortion of the glass fibers from the charged planar configuration occurs which results in a non-uniform composition with respect to glass distribution in the area of the rib or boss. Because of this, resin rich, i.e., glass fiber deficient, areas occur at the appearance surface of the part over the ribs and bosses. It is thought that as the cured molding cools to ambient temperatures, differential contraction can occur causing very slight sink marks. These sink marks are not related to polymerization shrinkage. The polymerization shrinkage problem was overcome by the invention of low shrink resins. When a molding is made in accordance with this invention, the short fiber SMC, which has less flow resistance, flows preferentially into the ribs and bosses, leaving the long fiber SMC relatively undisturbed near the appearance surface of the article where these reinforcing fibers retain a planar configuration. The resulting composition remains more uniform with respect to glass distribution and the resin rich areas which cause sink over the ribs and bosses do not occur.

In FIG. 1, appearance surface forming surface 12 of the top platen 13 of the mold comes in contact with a first ply of sheet molding compound 14 having long glass fibers 15 dispersed therein. The convoluted bottom platen 16 of the mold comes in contact with a ply of sheet molding compound 17 having short fibers 18 dispersed therein.

In the illustrated embodiment, a third ply 19 having short fibers 21 is to be molded between plies 14 and 17. The bottom platen 16 of the mold contains rib forming convolutions 22 into which the sheet molding compound flows when the mold is closed and heat and pressure illustrated by force lines 38 and 39 are applied.

FIGS. 2 and 3 show sections of articles of the prior art and of the invention, respectively, containing ribs 23 and 24 respectively, and appearance surfaces 25 and 26 respectively. The prior art molded article has a sink mark 27 above the rib 23 whereas the inventive article is smooth in the portion 28 of the appearance surface 26 above the rib 24.

FIGS. 4 and 5 are analogous to FIGS. 2 and 3, respectively, showing sink marks 29 above ribs 31 and bosses 32 in prior art articles 33 whereas articles 34 molded in accordance with the teachings of the invention have smooth appearance surface 35 above ribs 36 and bosses 37.

FIG. 6 shows preparation of a single ply of SMC having long fibers 51 adjacent one side and short fibers 49 adjacent the other side of the sheet. This is accomplished in the illustrated embodiment by continuously cutting glass fiber roving 45 by means of cutter roll 46 and cot roll 48, with knife blades 47 spaced so as to cut short fibers 49 which are applied on a first layer 44 of polyester compositions which has been applied by means of doctor blade 41 to a continuously moving sheet of polyethylene film 43 on a moving belt 42. Long fibers 51 are then applied on top of the short fibers, and remain as a distinct layer even after a second layer of polyester composition is applied on top and the compaction or impregnating roll 52 is used to form the SMC 53.

The following non-limiting examples are presented to illustrate a few embodiments of the invention.

EXAMPLE I

Three low shrink sheet molding compositions containing 30% by weight of glass fibers and 70% by weight of the following composition are prepared and designated SMC-1, SMC-2, and SMC-¼.

| | |
|---|---|
| Polyester of maleic anhydride with propylene glycol dissolved in styrene at a weight ratio of polyester to styrene of 65/35 and an acid number of 20 | 24 parts by weight |
| 32 parts by weight acid functional thermoplastic polymer (methyl methacrylate/ethyl acrylate/acrylic acid) (weight ratio of 85/13/2) in 68 parts by weight styrene | 16 parts by weight |
| Calcium carbonate filler (Camel- | |

| | | | |
|---|---|---|---|
| wite) | | 60 parts by weight | |
| Tertiary butyl perbenzoate (catalyst) | | 0.4 parts by weight | |
| Magnesium hydroxide (thickening agent) | | 1.0 parts by weight | |
| Zinc stearate (mold release agent) | | 2 parts by weight | |

SMC-1 contains glass fibers 1 inch long. SMC-2 contains glass fibers 2 inches long and SMC-¼ contains fibers ¼ inch long. The SMCs are each about 0.1 inch thick and are about 0.8 pounds per square foot. Three plies of SMC are introduced into a matched-metal die box-shaped mold which is 7 × 12 × 1½ inches and contains a rib ⅞inch deep with 5° draft on the rib sides and one-fourth inch fillet radius at the base. The molding conditions for each run are 300°F. and 835 psi pressure for two minutes after which the parts are ejected hot and allowed to cool to room temperature. The depth of the sink mark over the rib is measured with the Bendix Microcorder.

| | Configuration of Charge | | | |
|---|---|---|---|---|
| Molding | SMC Against Flat Appearance Mold Surface | SMC in Center | SMC Against Ribbed Mold Surface | Depth of Sink Marks (microinches) |
| A | SMC-1 | SMC-1 | SMC-1 | 360 |
| B | SMC-2 | SMC-2 | SMC-2 | 630 |
| C | SMC-¼ | SMC-¼ | SMC-¼ | 210 |
| D | SMC-2 | SMC-2 | SMC-¼ | 420 |
| E | SMC-2 | SMC-¼ | SMC-¼ | 90 |

Moldings A, B and C having single glass lengths and Molding D having a greater weight of long fibers than short fibers are outside of the invention. Molding E illustrates the surprisingly low depth of sink obtainable in accordance with this invention.

EXAMPLE II

An SMC is prepared from the same polyester, thermoplastic polymer, filler, catalyst, thickening agent, and mold release agent compositions and ratios by first applying the composition to a continuously moving polyethylene film, then putting one-fourth inch glass fibers on the composition. On top of the one-fourth inch fibers are then applied 1 inch fibers. The long fibers lay on top of the short fibers and do not sink into the resin composition. Another layer of composition is then applied on top of the 1 inch glass fibers by first applying a layer to a second polyethylene film and applying so as to make a sandwich-type structure which is then compressed in the usual manner and allowed to thicken. After adequate thickening takes place, the sheet is molded with the long fiber side of the sheet against the appearance side of the mold. The molded article is substantially free of sink marks in its appearance surface.

While the invention has been described in some detail by way of illustration and example, it is understood that various changes and modifications can be made without departing from the spirit and scope of the invention.

I claim:

1. An article of manufacture having a first side essentially smooth and free of sink marks and a second side having reinforcing ribs, said article having been molded from glass fiber-containing unsaturated polyester sheet molding composition, wherein the average glass fiber length adjacent the first side is at least twice the average fiber length adjacent the second side, wherein the average glass fiber length adjacent the first side is about 1 to 4 inches and the average fiber length adjacent the second side is ⅛ to 1 inch, and the weight of the short glass fibers comprise at least half of the total fiber weight.

2. An article in accordance with claim 1 wherein said article is molded from at least two plies of sheet molding composition, wherein the average glass fiber length in the ply adjacent the first side is at least twice the average fiber length in the ply adjacent the second side.

3. A method producing a glass fiber reinforced article having a smooth appearance side essentially free of sink marks and an opposite side having ribs and bosses comprising:

A. introducing at least one ply of long glass fiber-containing sheet molding compound and at least one ply of short glass fiber-containing sheet molding compound in a mold so that a ply of short fiber sheet molding compound will come in contact with the ribbed side of the mold and a ply of long fiber sheet molding compound will come in contact with the smooth side of the mold;

B. closing the mold and applying heat and pressure to the multiple plies; and

C. removing the resultant article from the mold wherein the average glass fiber length adjacent the first side is about 1 to 4 inches and the average fiber length adjacent the second side is ⅛ to 1 inch, and the weight of the short glass fibers comprise at least half of the total fiber weight.

4. The method of claim 3 wherein the long glass fibers are at least about twice as long as the short glass fibers.

5. The method of claim 3 wherein two plies of short glass and one ply of long glass sheet molding compound are employed.

6. The method of claim 3 wherein each ply is about 0.05 to 0.3 inch thick.

* * * * *

Dedication 3,903,343.—*Frederick Pfaff*, Cornwells Heights, Pa. METHOD FOR REDUCING SINK MARKS IN MOLDED GLASS FIBER REINFORCED UNSATURATED POLYESTER COMPOSITIONS, AND MOLDED ARTICLES THEREBY PRODUCED. Patent dated Sept. 2, 1975. Dedication filed Sept. 24, 1980, by the assignee, *Rohm and Haas Company*.

Hereby dedicates the remaining term of said patent to the Public.

[*Official Gazette December 23, 1980*]